Nov. 8, 1938.　　　G. FISHER ET AL　　　2,136,076
PATTERN CONTROL MECHANISM
Filed Nov. 13, 1936　　　3 Sheets-Sheet 1

INVENTOR
George Fisher
BY William S. Tandler
Pennie, Davis, Marvin & Edwards
ATTORNEYS Nov. 8, 1938.  G. FISHER ET AL  2,136,076
PATTERN CONTROL MECHANISM
Filed Nov. 13, 1936  3 Sheets-Sheet 3

INVENTOR
George Fisher
William S. Fiedler
BY
Pennie, Davis, Marvin & Edmonds
ATTORNEYS Patented Nov. 8, 1938

2,136,076

UNITED STATES PATENT OFFICE 2,136,076

PATTERN CONTROL MECHANISM

George Fisher and William S. Tandler, New York, N. Y., assignors to Lefier Patent Company, Inc., New York, N. Y., a corporation of New York Application November 13, 1936, Serial No. 110,606

19 Claims. (Cl. 139—55)

This invention relates to control apparatus used for controlling the operation of a machine having a plurality of parts to be selectively actuated, examples of such a machine being a loom for the weaving of figured fabrics in which the warp threads are manipulated by heddles in accordance with a pattern to reproduce the desired design on a fabric, or a flat bed knitting machine in which the needles are brought selectively into the knitting operation. More particularly, the invention is concerned with a novel control apparatus of the electromechanical type which may be employed for selecting or for both selecting and operating the parts of the machine requiring selective actuation. While the invention may be employed in connection with machines of various kinds, it affords special advantages when used for controlling the operation of a loom. An embodiment of that invention for that particular purpose will, accordingly, be illustrated and described in detail for purposes of explanation, although it is to be understood that the utility of the invention is not limited to that specific adaptation.

The new apparatus is operated under the control of a pattern, and when the apparatus is used for controlling the operation of a loom, the pattern takes the form of a pattern sheet carrying a representation of the design to be reproduced in the fabric. This pattern is scanned by mechanism of either the direct contact or photoelectric types and the scanning mechanism controls the operation of devices which select and actuate the heddles either directly or through needles controlling hooked wires attached to the heddles. When direct control is employed, the apparatus takes the place of an entire jacquard mechanism and, in either form, makes unnecessary the preparation of a set of punched jacquard cards for each type of fabric to be woven. The use of the new apparatus consequently simplifies and reduces the cost of manufacturing patterned fabrics to an important extent.

While the principles of the invention may be employed in various types of apparatus, the mechanism in all forms includes a plurality of control members, one for each machine part or group of parts to be controlled, and connecting means for connecting the control members to the parts to be controlled thereby. The action of the control members on the parts is then controlled by a plurality of selector elements, one for each control member, these elements being selectively operated by a device actuated under the control of the pattern scanning mechanism.

For a better understanding of the invention, reference may be made to the accompanying drawings in which Figure 1 is a vertical sectional view of one form of the control apparatus with certain parts shown in elevation;

Figure 1:
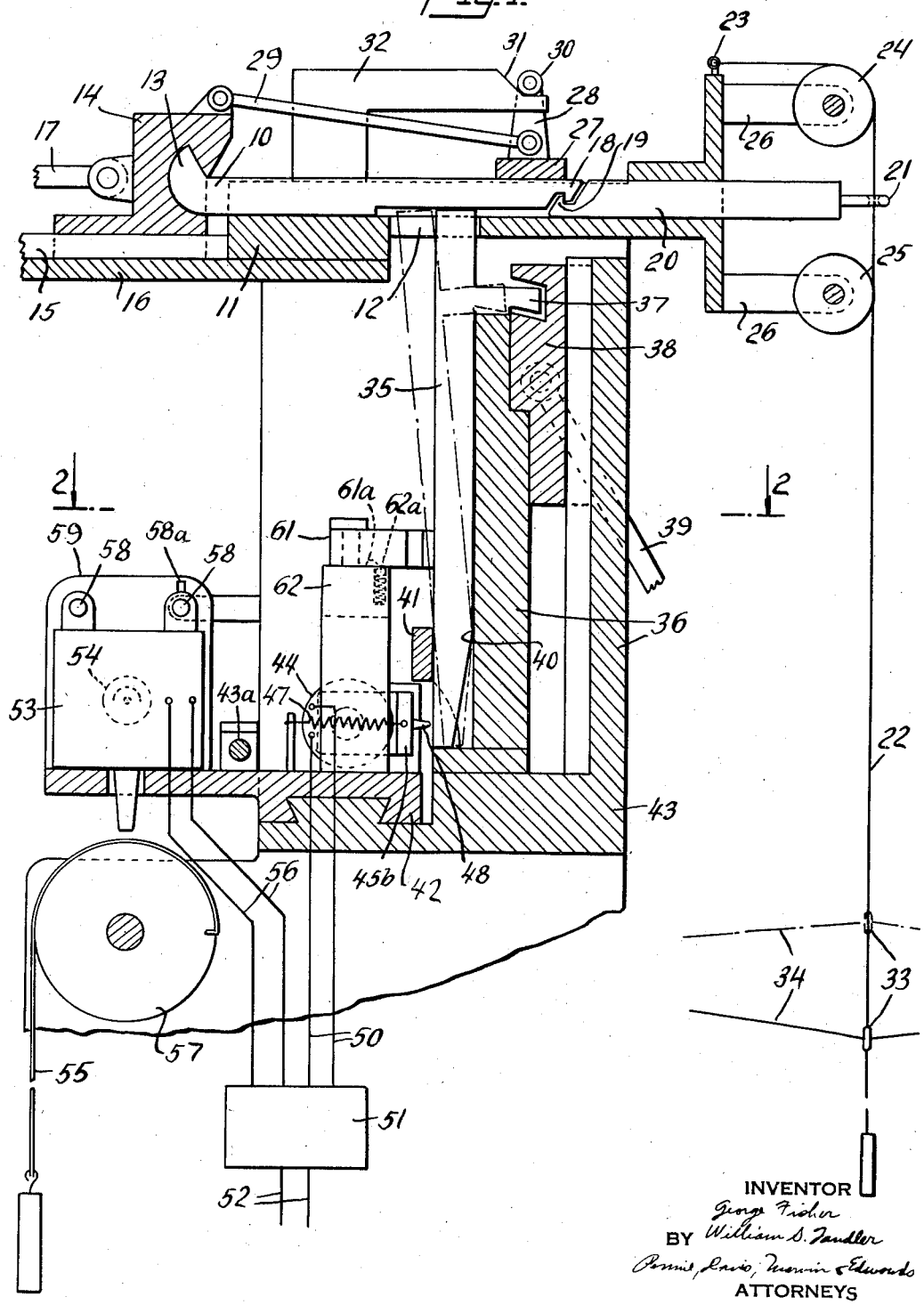

Referring to the drawings, the apparatus as shown in Figure 1 comprises a plurality of control members 10, which are preferably thin metal plates, mounted on edge in individual slots in a support 11, through which are formed openings 12, each communicating with one of the slots. Each of the members is provided with an enlarged hooked end 13 which is received in a suitable recess in a block 14, reciprocated in guideways 15 in a plate 16 by a link 17 actuated by a cam or other suitable means, the engagement of the hooked end of each member in its recess being such that the member will move with the block. The free end of each control member is provided with a hook 18 adapted to engage a similar hook 19 on a connecting member 20, which is preferably a thin plate movable in the slot in which its associated control member moves.

Each connecting member 20 is connected operatively to the part of the machine to be controlled, and when the device is employed in connection with a loom, the connecting member 20 may be directly or indirectly connected to a heddle or to a group of heddles which are operated in unison. In the construction shown, the connecting member is directly connected to the heddle and, for this purpose, is provided with an eye 21 through which the heddle cord 22 passes, the cord being attached at one end to an eye 23 mounted on the support 11. The cord leads from eye 23 around a rotary guide 24, through the eye 21, and around another rotary guide 25, the guides 24 and 25 being supported in any convenient manner, as on brackets 26 attached to the support 11. Initially, the hooks 18 and 19 of the control and connecting members, respectively, are in engagement and they are held in this position by a plate 27 which rests on the top of the control members near the hooks and is provided with brackets 28 connected by one or more links 29 to the block 14. A roller 30 connecting the brackets rests upon cam surfaces 31 on brackets 32 attached to support 11 and these surfaces raise and lower the plate 27 as the latter is moved back and forth by the block 14.

In the operation of the apparatus, the block 14 reciprocates in its guideways and moves all the control members 10 with it. In this movement, the control members move those connecting members to which they are connected, and this causes a pull on cords 22 to raise the eyes 33 and elevate the warp threads 34 passing through the eyes. The selection of the warp threads to be raised in this manner is then effected by controlling the connections through the members 20 between the control members 10 and their respective heddle cords.

The mechanism for controlling the connections referred to includes a plurality of selector elements 35, one for each control member 10, which are preferably thin plates of metal mounted in vertical slots in a plate 36 with their upper ends passing through the openings 12 in support 11 and lying close to or in contact with the bottom edges of the control members. Each selector element is provided with a projection 37, which in the initial position of the member, enters a recess in a block 38 reciprocated vertically in guideways in the support 36 by a link 39 actuated by a cam or other suitable means. Near its lower end, the edge of each selector element lying at the bottom of its slot is cut away at an angle to provide a fulcrum point 40, opposite which is a retaining bar 41 bearing against the outer edges of all the elements. When the block 38 is raised, it engages the projections 37 of such of the selector elements as are in vertical position and raises these elements. In their upward movement, the elements engage and lift their respective control members against the action of bar 27 to an extent sufficient to disengage hooks 18 of the control members from hooks 19 of the connecting members.

The selector elements, which are to act on the control members in the manner described, are selected by a pattern control device which includes a carriage 42 which is reciprocated along a support 43 by a link 43a actuated by any suitable means. Mounted on the carriage is an electromagnet 44 having an armature 45 of bell-crank form, pivoted on the carriage and having one arm 45a held against a stop pin 46 by a spring 47. The other arm 45b of the bell crank acts as a hammer and is provided with a stud 48. The electromagnet receives current through wires 50 from an amplifier 51 connected to a source of power by lines 52.

The supply of current to the electromagnet is controlled by a scanning mechanism 53 mounted on the carriage 42. The scanning device as illustrated is of the photoelectric type and includes a photoelectric cell 54 which responds to light reflected from the pattern sheet 55 and operates through connections 56, to control the flow of amplified current delivered from the amplifier to the electromagnet 44. The scanning device and pattern sheet have a relative movement both lengthwise and transverse of the pattern sheet during the operation of the apparatus, and, for this purpose, the pattern sheet preferably has one end attached to a cylinder 57 which is rotated with a step by step movement by any suitable means. During each period of rest of the pattern sheet, the carriage 42 makes one traverse so that a line along the pattern is scanned.

The pattern 55 carries a representation of the design to be reproduced in the fabric with different areas on the design shown in colors differing in their reflection of light. Each line across the pattern is made up of areas representing warp threads and each such area thus controls the action of one of the selector elements, and, as the scanning device moves along the pattern, the electromagnet moving with it is energized in accordance with the areas in a line on the pattern and acts on the selector elements. Because of the necessity of building up the magnetic field, the electromagnet does not operate as rapidly as the scanning mechanism and it is, therefore, necessary to give the scanning mechanism a lead relative to the electromagnet. For this purpose, the scanning mechanism is mounted on rods 58 which are supported in openings in uprights 59 extending upward from the carriage 42. The rods 58 project outwardly beyond the uprights and at each end of the path of travel of the carriage, one of the rods engages a yielding stop 60 so that the scanning mechanism is held for a short period while the carriage continues to move. This causes the scanning mechanism to be shifted relative to the carriage until one of a pair of stop pins 58a on a rod 58 contacts with one of the uprights 59, and when the carriage makes its return movement, the scanning mechanism has a lead relative to the electromagnet. The extent of the lead is determined by the positions of the pins 58a on rod 58 and is made just sufficient to insure that the electromagnet will operate properly under the control of the scanning mechanism.

The scanning mechanism employed may be of either the photoelectric or direct contact types, such as are illustrated and described in the copending application of Fisher, Tandler, and Carlisle Serial No. 92,112, filed July 23, 1936, and various forms of electromechanical means may be employed for moving the selector elements, such, for example, as that illustrated and described in our copending application Serial No. 101,233, filed September 17, 1936.

With the mechanism illustrated, all of the selector elements are in vertical position at the beginning of operations, and the carriage 42 is advanced along the support 43, the scanning mechanism at the same time making a traverse across the pattern. Current is supplied to the electromagnet from the amplifier at different points in the travel of the carriage, as determined by the scanning mechanism, and when the electromagnet 44 is thus energized, its armature 45 is moved so that the stud 46 on hammer 45b strikes the selector element with which it is momentarily in registry, and swings this element about its fulcrum point, to the dotted line position illustrated in Figure 1. When the carriage has completed its traverse, certain of the selector elements will be in the vertical position, while others will have been swung. The block 38 rises, carrying with it the selector elements which stand vertical, and these elements raise their respective control members. While the block 38 remains in its upper position, the block 14 begins to move to the left, in Figure 1, drawing the control members with it. Those members which have not been raised by their selector elements are connected to their respective connecting members 20 by hooks 18, 19, while the control members which have been raised by the selector elements are disengaged from their connecting members. In the movement of the block 14, therefore, certain of the connecting members will be pulled by their associated control members, while other connecting members will remain at rest. During the movement of the control members by the block 14, the plate 27 is raised by reason of the roller 30 riding up the cam surface 31 so that the plate is free of the top edges of the control members.

The block 14 in its movement acts on certain of the heddle cords to raise the heddle eyes and thereby elevate the warp threads passing through these eyes. When these warp threads have been elevated to the extent necessary to produce a shed, the block 14 remains at rest until the shuttle is thrown. The block is then returned to its original position and the next sequence of operations takes place.

The selector elements which have been raised by the block 38 remain in their upper position for only a brief period and until the hooks 18 of the control members raised by the elements have cleared the hooks 19 of their respective connecting members. If the nature of the pattern is such that current is supplied to the electromagnet for a period during which the stud 48 passes several selector elements, these elements are engaged by the stud and moved by the cam action of the latter. For this purpose, the stud has a tapering shape as shown, and the walls of the slots, in which the elements are received, are cut away in registry with the path of the stud so that the latter may perform its cam function. As soon as this action has taken place, the block 38 moves down and restores the elevated selector elements to their original positions. Those control members which have been raised by the selector elements are then either held elevated by friction during the reciprocation of block 14, or else move down by gravity. In either event, when the block 14 returns, the hooks 18 either slide up the inclined front surfaces of hooks 19 or else pass over the tops of these hooks. The final tight engagement of hooks 18 and 19 is effected by the lowering of the plate 27 by the movement of roller 30 down cam surface 31.

As soon as block 38 has restored the elevated selector elements to their initial positions, the elements may be selected for the next shed and this is accomplished by another traverse of carriage 42. Since certain of the elements have been selected in the previous operation and may not again be selected, it is desirable that all elements be restored to vertical position before they are acted on by the hammer. For this purpose, a bell crank lever 61 is pivotally mounted on a support 62 attached to carriage 42, the bell crank lying above the fulcrum point 40 of the selector elements. The bell crank is moved on its pivot by adjustable stops 62 lying at the ends of the path of travel of the carriage, and as the bell crank approaches one or the other of the stops, the stop strikes one end of the lever and swings the latter on its pivot. The lever is held in this position by one or the other of a pair of spring pressed balls 62a mounted in recesses in the support 62 and engageable with recesses 61a in the under sides of the arms of the lever.

Figure 2:
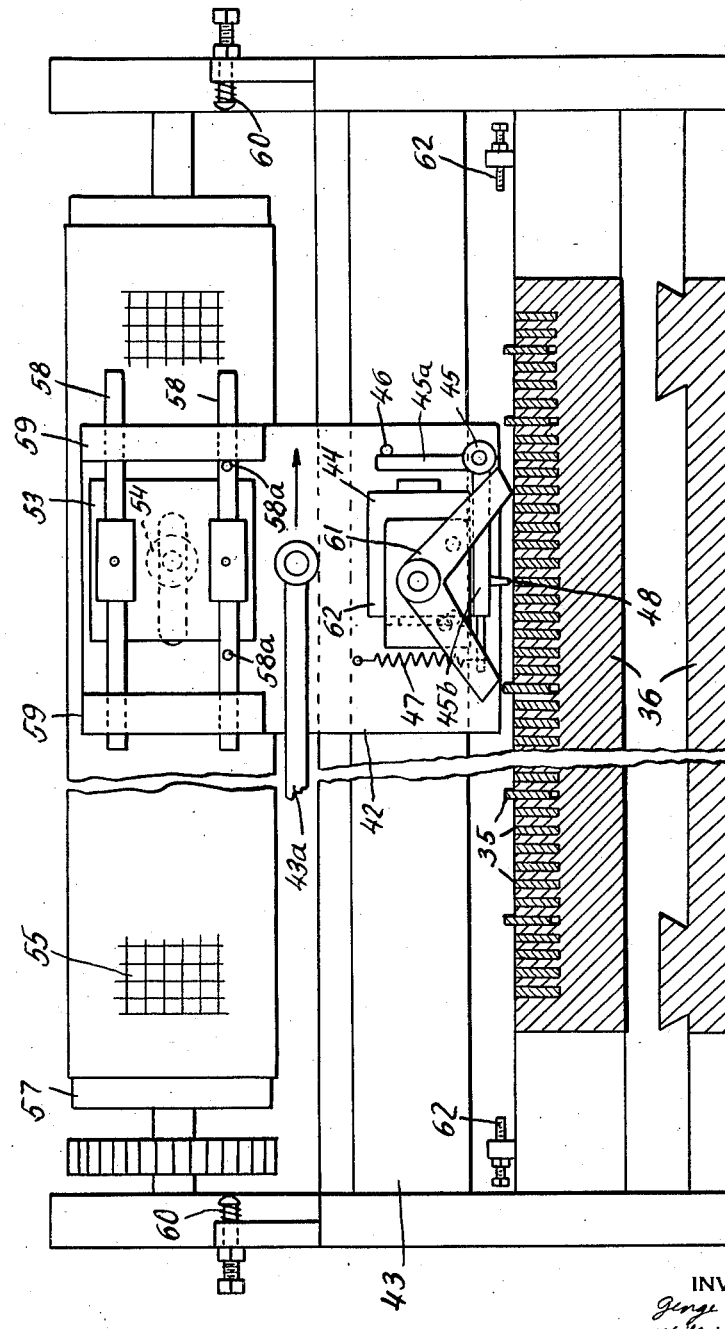
Figure 2 is a sectional view on the line 2—2 of Figure 1.

As illustrated in Figure 2, the carriage is moving to the right and the bell crank is swung so that its arm at the right lies close to the faces of the selector elements. As the carriage moves along, this arm strikes the selector elements which have been swung to inclined position and forces them back into their slots. The selector elements are then in proper position so that they may be acted on by the electromagnetic hammer which lies behind the effective arm of the bell crank. When this arm engages the stop 62 at the right, the bell crank is swung so that its arm at the left is brought into effective position and operates during the return movement of the carriage.

Figure 3:
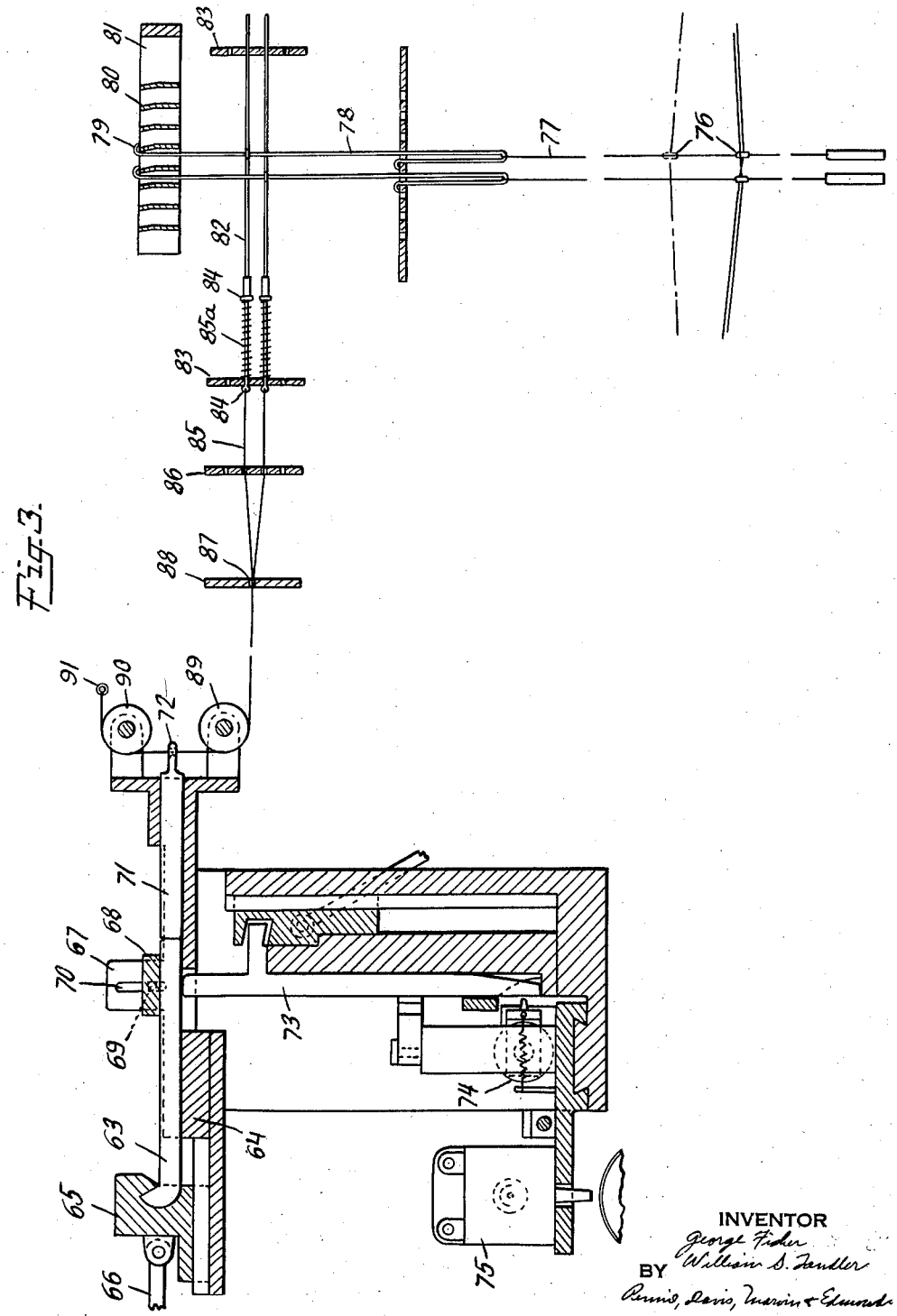
Figure 3 is a view similar to Figure 1 of a modified form of the apparatus.

The construction illustrated in Figure 3 is generally similar to that shown in Figure 2 except that the control members push upon their associated connecting members and the latter do not directly actuate the heddles but move needles which control the position of hooked wires to which the heddles are attached.

In the Figure 3 construction, control members 63 are mounted in slots in a support 64 and are reciprocated by a block 65 actuated by a link 66. The control members are provided with vertical extensions 67 on which a weighting plate 68 is mounted, the plate being held in position by means of a rod 69 passing through slots 70, one in each extension 67. At their free ends, the control members abut the ends of connecting members 71 provided with eyes 72. The operation of the control members on the connecting members is controlled by selector elements 73 which are selected by an electromagnetic hammer 74 similar to that employed in the construction illustrated in Figure 1, this hammer being actuated under the control of a scanning mechanism 75.

The heddles include eyes 76 attached to cords 77 which are in turn attached to wires 78 having hooks 79 which may be engaged and raised by lifting knives 80 carried by a frame 81, the wires being controlled by needles 82 supported in plates 83. Each needle carries a collar 84 and is encircled by a spring 85a which bears at one end against the collar and at the other end against one of the plates 83. The needle has an eye 84 beyond the plate 83 against which the spring bears and a connecting cord 85 leading from the eye 84 passes through an opening in a plate 86, the cords 85 being then guided through openings 87 lying in a single line in a guide plate 88. Each connector passes through its opening 87, around a rotary guide 89, then through an eye 72 of a connecting member, and around another rotary guide 90 to an anchorage 91.

With the construction illustrated in Figure 3, selector elements selected in accordance with the pattern are raised and thereby elevate the free ends of their associated control members 63. The block 65 then moves the control members endwise and those members which have not been elevated engage the ends of their respective connecting members 71, while the elevated control members pass over the ends of their associated connecting members. The connecting members which are thus moved endwise, carry with them the connecting cords 85, and this results in the needles 82 to which the cords are attached being moved endwise against the action of their springs 85. The movement of the needles displaces the hooked wires, which they control, out of the path of the lifting knives 81, so that when the frame 80 rises, the knives thereon engage the hooks of certain of the wires 78 and do not act on other wires. The upward movement of the frame causes the warp threads controlled by the heddles attached to the elevated hooked wires to be raised so that a shed is produced. After the passage of the shuttle through this shed, the knife frame 80 moves down and the control members 63 are restored to their initial positions by the return movement of the block 65. The connecting members 71 which have been advanced by the control members are then restored to their initial positions by the pull of the springs 85, acting to straighten the lengths of the connecting cords lying between the guides 89 and 90 and passing through eyes 72 of connecting members.

The apparatus illustrated in Figure 3 includes a scanning mechanism of the photoelectric type, but it is to be understood that a direct contact mechanism may be used, if desired. Also, in the Figure 3 apparatus as shown, the control mechanism does not directly operate the selected heddles, but selects the heddles which are then raised by the usual lifting frame. It is to be understood that the second form of the apparatus may act directly on the heddles, if desired. With both forms of apparatus, however, it is unnecessary to employ a set of punched cards to control the operation of the loom in the weaving of each type of patterned fabric and the new apparatus, therefore, simplifies and reduces the cost of weaving.

In the two constructions illustrated, the selector elements operate on the control members and thereby control the connections between the members and the heddles. It will, of course, be apparent that the selector elements may operate on the connecting members, rather than the control members, if desired. Also, in the apparatus as illustrated, the connecting members are not directly attached to the heddle cords but have eyes through which the heddle cords pass. Direct connections, however, may be used if desired, in which case in the Figure 3 construction, means such as springs will be employed to restore the connecting members to their original positions after they have been acted on by the control members.

While the new control apparatus has been illustrated and described in a form suitable for controlling the operation of a loom, its utility is not limited to that adaptation, as will be readily understood, and it may be used either for selecting or for both selecting and actuating parts of various kinds of machines.

We claim:

1. Apparatus for controlling the operation of a machine having a plurality of selectively operable parts, which comprises the combination of a plurality of control members, means operable to establish individual connections between said members and respective parts to be controlled thereby, means for moving said members and the parts connected thereto, a plurality of selector elements, one for each member, means for selecting elements to be operated including a pattern mechanism, and means for moving selected elements to cause them to effect a relative displacement of their respective control members and associated connecting means and render said means ineffective.

2. In apparatus for controlling the operation of a machine having a plurality of parts to be selectively operated, the combination of a plurality of control members said members being mounted in guideways, means for moving said members endwise in said guideways, a plurality of connecting members, one for each control member, said connecting members being operatively connected to individual parts and being operable by said control members, a plurality of selector elements, one for each control member and lying at an angle thereto, and pattern-controlled means for moving selected elements to cause them to effect a relative displacement of their associated control members and the respective connecting members to render the latter ineffective.

3. In apparatus for controlling the operation of a machine having a plurality of parts to be selectively operated, the combination of a plurality of control members said members being mounted in guideways, means for connecting said members to the parts to be controlled thereby, means for moving said members endwise in the guideways to act through their connecting means to operate their respective parts, a plurality of selector elements, one for each control member, mounted in guideways at an angle to the guideways for the control members, and pattern-controlled means for moving selected elements to cause them to engage and move their respective members and render said members ineffective to act through their connecting means.

4. In apparatus for controlling the operation of a machine having a plurality of parts to be selectively controlled, the combination of a plurality of control members, means for reciprocating said members in unison in a plane, means for connecting said members to the parts to be controlled thereby, a plurality of selector elements, one for each member, means for reciprocating selected elements in a plane intersecting the plane of movement of said members, said selected elements operating to displace their respective members from their plane and render them ineffective to act through their connecting means on their associated parts, and pattern-controlled means for selecting the elements to be reciprocated.

5. In apparatus for controlling the operation of a machine having a plurality of parts to be selectively controlled, the combination of a plurality of control members, means for reciprocating said members in unison in a plane, normally operative means connecting said members to the parts to be controlled thereby, a plurality of selector elements, one for each member, means for reciprocating selected elements in a plane intersecting the plane of movement of said members, said selected elements operating to render ineffective the connecting means of their respective control members, and pattern-controlled means for selecting the elements to be reciprocated.

6. In apparatus for controlling the operation of a machine having a plurality of parts to be selectively controlled, the combination of a plurality of control members said members being mounted in guideways for endwise reciprocation, means for reciprocating said members in unison, a plurality of connecting members, one for each control member, connected to the parts to be controlled thereby and connectable to their associated control members for actuation thereby, a plurality of selector elements, one for each control member, said elements being mounted in guideways for endwise reciprocation, means for reciprocating selected elements to cause them to displace their associated control members during the reciprocation of the latter and render said members ineffective to act through their associated control members, and means for selecting the selector elements to be reciprocated including a pattern, a scanning device, and means controlled by said scanning device for acting on said elements.

7. In apparatus for controlling the operation of a machine having a plurality of parts to be selectively controlled, the combination of a series of selector elements, means normally engageable with said elements to reciprocate them in unison, a pattern, means for scanning said pattern, a device controlled by said scanning means and operable to move said elements, means for reciprocating said device along said series, and means operable after the completion of a reciprocation of said device to restore said elements moved thereby to their initial positions.

8. In apparatus for controlling the operation of a machine having a plurality of parts requiring selective actuation, the combination of a pattern element, a carriage reciprocable across the pattern element, a device for scanning the pattern element mounted on the carriage, and means operable to shift the device on the carriage in the direction of the next reciprocation of the carriage, said means operating before the device begins to scan the pattern element during said reciprocation.

9. In apparatus for controlling the operation of a machine having a plurality of parts requiring selective actuation, the combination of a pattern element, a carriage reciprocable across the pattern element, a device for scanning the pattern element mounted on the carriage, and means operating at the ends of the path of reciprocation of the carriage for shifting the device on the carriage in the direction of the next reciprocation of the latter.

10. In apparatus for controlling the operation of a machine having a plurality of parts to be selectively controlled, the combination of a series of selector elements, a carriage travelling along the series of elements, pattern-controlled means on the carriage operable to shift selected elements from an initial position, and means on the carriage acting ahead of the shifting means during each movement of the carriage to restore previously shifted elements to their initial position.

11. In apparatus for controlling the operation of a machine having a plurality of parts to be selectively controlled, the combination of a series of selector elements, a carriage reciprocable along the series of elements, pattern-controlled means on the carriage operable to shift selected elements from an initial position, and means on the carriage acting ahead of the shifting means during each movement of the carriage in either direction to restore previously shifted elements to their initial position.

12. In apparatus for controlling the operation of a machine having a plurality of parts to be selectively controlled, the combination of a series of selector elements, a carriage travelling along the series of elements, an electromagnetically operated hammer on the carriage operable to engage and shift selected elements from an initial position, and means on the carriage acting ahead of the hammer during each movement of the carriage to restore previously shifted elements to their initial position.

13. In apparatus for controlling the operation of a machine having a plurality of parts to be selectively controlled, the combination of a series of selector elements, a carriage reciprocable along the series of elements, an electromagnetically operated hammer on the carriage operable to engage and shift selected elements from an initial position, a lever on the carriage operable ahead of the hammer during each movement of the carriage in either direction to restore previously shifted elements to their initial position, and means at each end of the path of travel of the carriage to swing the lever and render it effective.

14. Apparatus for controlling the operation of a machine having parts to be selectively controlled, which comprises the combination of a plurality of control members, a plurality of connectors, one for each member, for connecting said members to the parts to be controlled thereby, a plurality of selector elements, one for each connector, means for moving the selector elements into and out of contact with their respective members to displace the latter relatively to their associated connectors, and means operating selectively to prevent selected elements from being moved by said moving means.

15. Apparatus for controlling the operation of a machine having parts to be selectively controlled, which comprises the combination of a plurality of control members, a plurality of connectors, one for each member, and normally connecting the members to the parts to be controlled thereby, a plurality of selector elements, one for each connector, means operable to move the selector elements into and out of contact with their respective members to break the connection between said members and their associated connectors, and means operating selectively to prevent selected elements from being moved by said moving means.

16. Apparatus for controlling the operation of a machine having parts to be selectively controlled, which comprises the combination of a plurality of control members, a plurality of connectors, one for each member, for connecting said members to the parts to be controlled thereby, a plurality of selector elements, one for each connector, means operable to move the selector elements in unison into and out of contact with their respective members to displace the latter relatively to their associated connectors, and means operating selectively to prevent selected elements from being moved by said moving means.

17. Apparatus for controlling the operation of a machine having parts to be selectively controlled, which comprises the combination of a plurality of control members, a plurality of connections, one for each member, for connecting said members to the parts to be controlled thereby, a plurality of selector elements, one for each connector, a reciprocating member operable to move the selector elements into and out of contact with their respective control members to displace the latter relatively to their associated connectors, and means operating selectively to prevent selected elements from being moved by said movable member.

18. Apparatus for controlling the operation of a machine having parts to be selectively controlled, which comprises the combination of a plurality of control members, a plurality of connectors, one for each member, for connecting said members to the parts to be controlled thereby, a plurality of selector elements, one for each connection, means for moving the selector elements into and out of contact with their respective connectors to displace the latter relatively to their associated members, a selecting device including an electromagnetically operated hammer for engaging and moving selected elements to render them ineffective to engage their respective connectors, and means for moving the device and elements relatively to effect selection of the elements.

19. Apparatus for controlling the operation of a machine having parts to be selectively controlled, which comprises the combination of a plurality of control members, a plurality of connectors, one for each member, for connecting said members to the parts to be controlled thereby, a plurality of selector elements, one for each member and its associated connector, means for reciprocating said selector elements to cause them to produce a displacement of their respective members and connectors relative to one another, and means operating selectively on the selector elements to render the reciprocating means ineffective to act on selected elements.

GEORGE FISHER.
WILLIAM S. TANDLER.